United States Patent
Maina

[15] 3,648,536
[45] Mar. 14, 1972

[54] SELECTOR MECHANISMS FOR CHANGE-SPEED GEARS

[72] Inventor: Mario Joseph Maina, Luton, England
[73] Assignee: General Motors Corporation, Detroit, Mich.
[22] Filed: Nov. 18, 1969
[21] Appl. No.: 877,618

[30] Foreign Application Priority Data

Dec. 19, 1968    Great Britain ..................... 60,286/68

[52] U.S. Cl. ............................................................ 74/476
[51] Int. Cl. ........................................................ G05g 9/18
[58] Field of Search ................... 74/473, 475, 476, 477, 740, 74/745

[56] References Cited

UNITED STATES PATENTS

| | | | |
|---|---|---|---|
| 2,920,504 | 1/1960 | Sommer | 74/74.5 |
| 2,932,988 | 4/1960 | Flynn et al. | 74/740 X |
| 3,093,008 | 6/1963 | Wight | 74/745 X |
| 3,313,182 | 4/1967 | Nallinger | 74/740 |
| 2,547,317 | 4/1951 | Gustafson | 74/473 |
| 3,264,893 | 8/1966 | Stott et al. | 74/477 |

Primary Examiner—Milton Kaufman
Attorney—E. W. Christen, A. M. Heiter and C. R. White

[57] ABSTRACT

A selector mechanism for motor vehicle change speed gears, utilizing a single change speed lever for operating both a ratio selector member for a ratio-change gearbox, and a range selector member for a two-speed unit arranged to give one or more ratios additional to those obtainable from the ratio-change gearbox.

For this purpose, the change speed lever is pivotally mounted by way of a pivot pin on a carrier member which is itself pivotally mounted on a pair of coaxially arranged pivot pins and is also capable of translational movement along the pivot pins under the influence of a biasing spring. The change speed lever has a stirrup-joint motion-transmitting connection to a pivotable and slidable selector shaft forming the ratio selector member, with a stop arrangement being provided for limiting the pivotal movement of the selector shaft, and the carrier member has a flange-and-jaw motion-transmitting connection to a pivotal lever forming the range selector member. A hooklike latch member is movable with the pivotal lever to form an interlock for locking the selector shaft in one of its positions.

10 Claims, 7 Drawing Figures

Inventor
Mario Joseph Maina
BY
Charles R. White
Attorney

Inventor
Mario Joseph Maina
BY
Charles R. White
Attorney

Inventor
Mario Joseph Maina
BY
Charles R. White
Attorney

SELECTOR MECHANISMS FOR CHANGE-SPEED GEARS

This invention relates to selector mechanisms for change speed gears, for example in motor vehicles.

The invention is concerned with a selector mechanism which allows a single change speed lever to be used for operating both a ratio selector member, for example for a ratio-change gearbox, and a range selector member, for example for a two-speed unit arranged to give one or more ratios additional to those obtainable from the ratio-change gearbox.

According to the invention, from one aspect, in a selector mechanism for change speed gears, for example in a motor vehicle, a change speed lever is pivotally mounted on a carrier member and is selectively movable for effecting movement of a ratio selector member, and the carrier member is movably mounted and is arranged to be selectively movable by the change speed lever and thereby effect movement of a range selector member.

According to the invention, from another aspect, in a selector mechanism for change speed gears, for example in a motor vehicle, a change speed lever is pivotally mounted on a carrier member for pivotal movement about a first axis and is selectively movable for effecting movement of a ratio selector member, and the carrier member is mounted for pivotal movement about a second axis disposed at right angles to the first axis, and for translational movement along the second axis, and is arranged to be selectively movable by the change speed lever and thereby effect movement of a range selector member.

According to the invention, from still another aspect, in a selector mechanism for change speed gears: a change speed lever is pivotally mounted on a carrier member for pivotal movement about a first axis formed by a pivot pin; the carrier member is mounted for pivotal movement about a second axis formed by at least one pivot pin, and for translational movement along the second axis; the change speed lever has a motion-transmitting connection to a ratio selector member formed by a selector shaft which is mounted for pivotal movement about its major axis, which extends parallel to the first axis, and for translational movement along its major axis, in an arrangement in which the change speed lever is selectively movable for effecting selective pivotal movement and translational movement of the ratio selector member; and the carrier member has a motion-transmitting connection to a range selector member formed by a pivotal lever whose pivot axis extends parallel to the first axis, in an arrangement in which the carrier member is selectively movable in response to movement of the change speed lever, to thereby effect movement of the range selector member.

By use of a selector mechanism according to the invention, it is readily possible for the change speed lever to operate the ratio selector member in accordance with a normal shift pattern, and additionally to be displaced to a position beyond the normal shift pattern to operate the range selector member. The ratio selector member may for example be arranged for selective engagement of three or four forward ratios and a reverse ratio in an associated change speed gearbox, and the range selector member may be arranged for selective engagement of two further ratios, one or both of which may be an overdrive ratio, by the use of an auxiliary change speed transmission unit.

The present invention also comprehends a motor vehicle, for example a passenger car, having a drive line which includes change speed gears under the control of a selector mechanism as aforesaid.

The appended claims define the scope of the invention claimed. The invention and how it can be performed are hereinafter particularly described with reference to the accompanying drawings, in which:

Figure 1:
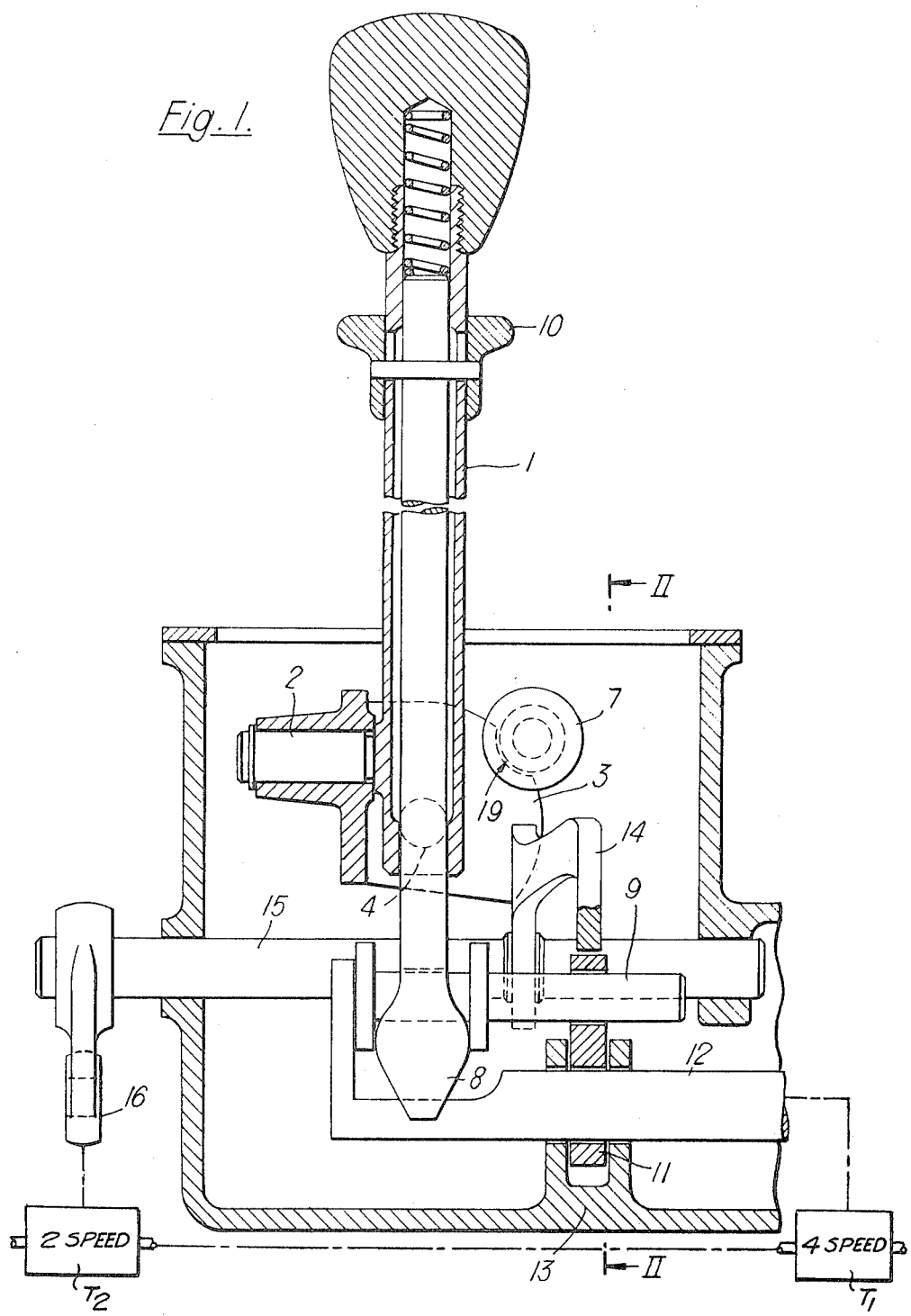
FIG. 1 is a fragmentary elevation, with some parts in section, of one embodiment of a selector mechanism according to the invention, arranged as a floor-mounted remote control mechanism in a motor vehicle.
Figure 2:
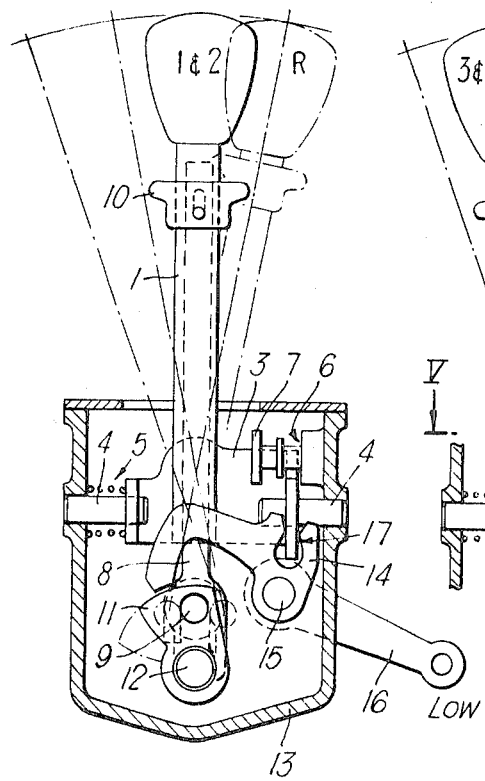
FIG. 2 is a transverse view, with some parts in section, generally on the line II—II of FIG. 1, in the direction of the arrows.

As can be seen for example in FIGS. 1 and 2 of the drawings, the embodiment of the selector mechanism according to the invention which is shown in the drawings includes a manually operable change speed lever 1 which is pivotally mounted by means of a pivot pin 2 on a movably mounted carrier member in the form of a bracket 3. The bracket 3 is mounted by means of bent over flanges on opposed pins 4 which allow both pivotal and translational movement of the bracket with respect to a second axis that is disposed at right angles to, and offset from, a first axis formed by the pivot pin 2. The two pivot axes at right angles form in effect a universal mounting for the change speed lever 1.

A helical compression spring 5 coaxially surrounding one of the pins 4 acts on the bracket 3 to bias it towards an abutment face 6 on a fixed locating pin 7, into a first position allowing selective engagement of gear ratios in an associated ratio-change gearbox T-1.

The change speed lever 1 is of hollow tubular form, and slidably accommodates an elongated internal member 8 which has a forked lower end portion forming a stirrup-joint connection to a crank pin 9 that is fixed to a crank arm carried at one end of a ratio selector member in the form of a selector shaft 12. The selector shaft 12 is mounted for pivotal movement about its major axis, and translational movement along its major axis, for selection and engagement respectively of gear ratios in the associated ratio-change gearbox T-1, as is described for example in the specification of our U.K. Pat. No. 983,564.

The stirrup-joint connection between the elongated internal member 8, on the one hand, and the crank pin 9 and selector shaft 12, on the other hand, comprises a pair of unequal-length legs which are formed by the forked lower end portion of the member 8 and straddle the crank pin of the selector shaft. The longer leg is normally engageable with the selector shaft 12 to inhibit movement of the change speed lever 1 into a reverse-ratio position designated R in FIG. 2, but is movable into a position clear of the selector shaft by lifting an external ringlike collar 10 which is disposed adjacent a knob at the upper end portion of the change speed lever, and is fixed to the member 8 by a cross-pin.

Alternatively, the collar 10 could be omitted, and the knob could be mounted on a projecting upper end portion of the member 8, such that lifting the knob would release the reverse stop.

An interlock plate 11 is arranged for pivotal movement conjointly with the selector shaft, in that the interlock plate is formed with a pair of apertures which give a sliding fit on the crank pin 9 and selector shaft 12 respectively, and thereby locate the interlock plate radially of the selector shaft. The interlock plate 11 is prevented from moving axially with the selector shaft by means of locating projections in a casing 13 for the selector mechanism, as is shown in FIG. 1.

Figure 4:
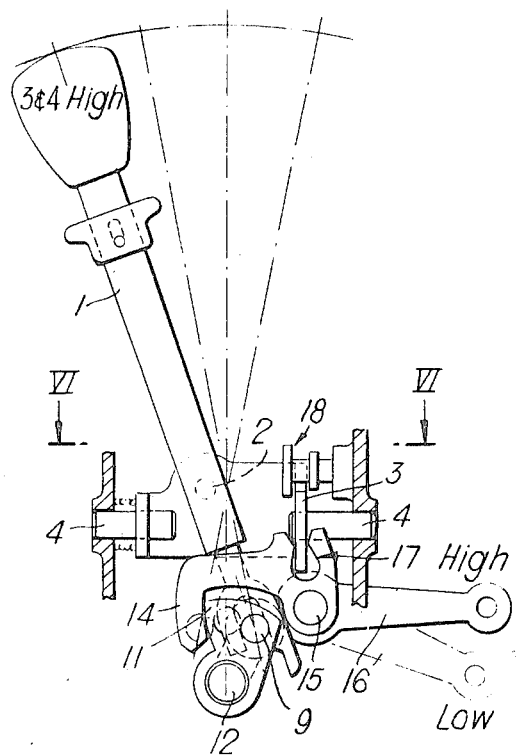

The selector mechanism also includes a range selector member in the form of a shaft 15 that is pivotally mounted in the casing 13, with one end of the shaft projecting from the casing and having fixed thereon an operating lever 16 for controlling an auxiliary two-speed transmission unit T-2 operatively connected to gearbox T-1. Fixedly mounted on the part of the shaft 15 within the casing 13 there is an interlock member comprising a hooklike latch member 14, this latch member thus being pivotally movable with the shaft 15 forming the range selector member. The latch member 14 is disposed essentially in the same plane as the interlock plate 11 and is selectively cooperable therewith. Specifically, in a first position of the interlock plate 11 the latch member 14 merely abuts the outer periphery of the interlock plate, as is shown in FIG. 2, but in a second position of the interlock plate the latch member can selectively cooperate with the interlock plate to lock it in its second position, as is shown in FIG. 4.

The operating lever 16, range selector shaft 15 and latch member 14 are pivotally movable as a unit in response to a translational movement of the carrier member formed by the bracket 3. For this purpose one of the flanges of the bracket 3 is accommodated between rounded jaws 17 of the latch member 14.

Figure 3:
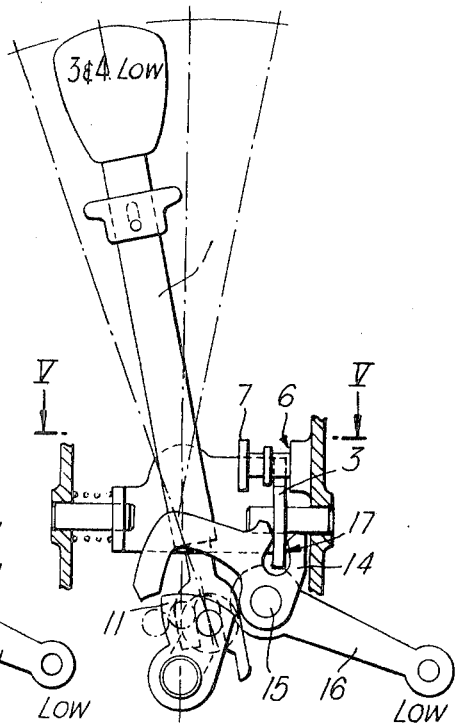
FIGS. 3 and 4 are fragmentary views similar to FIG. 2, showing the selector mechanism respectively in a 3–4 Low range position, and in 3–4 High range position involving actuation of a range selector member.

As is shown in FIG. 1, the flange of the bracket 3 that is accommodated between the jaws 17 of the latch member 14 includes an arcuate portion which, externally of the jaws, is formed with a recess 19 that cooperates with the fixed locating pin 7. When the pivotal position of the bracket 3 about the pivot axis formed by the pins 4 is as shown in FIG. 1 corresponding to a neutral position of the change speed lever 1, by manipulation of the change speed lever it is possible to produce translational movement of the bracket 3 along the pins 4 from a first position which is shown in FIG. 3, in which the bracket flange abuts the right-hand surface 6, to a second position in which, as is shown in FIG. 4, the bracket flange abuts a left-hand abutment surface 18 of the locating pin. In other pivotal positions of the change speed lever about the pivot axis formed by the pins 4, however, the arcuate portion of the bracket flange on one or other side of the recess 19 is engaged by the side wall of one of the grooves formed in the locating pin 7, whereby translational movement of the bracket 3 along the pins 4 is prevented.

Figure 6:
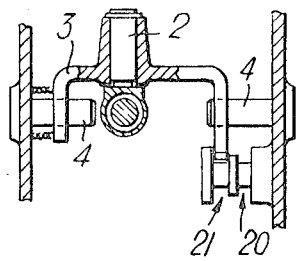

In FIG. 6, annular grooves on the two sides of the central land on the locating pin 7 are denoted 20 and 21, corresponding to the first and second positions respectively of the bracket 3.

Figure 7:
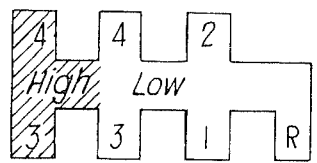
FIG. 7 illustrates the shift pattern of the selector mechanism shown in FIGS. 1 to 6.
Figure 5:
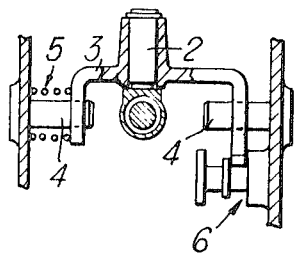
FIGS. 5 and 6 are fragmentary views generally on the lines V—V and VI—VI of FIGS. 3 and 4 respectively, in the direction of the arrows.

Operation of the embodiment of the selector mechanism according to the invention which has just been described is as follows:

In a first pivotal position of the change speed lever 1 about the pivot pin 2, namely the position shown in FIG. 2, both the selector shaft 12 forming the ratio control member, and the associated interlock plate 11, are in a first position corresponding to the first and second ratio 'gate' of the shift pattern shown in FIG. 7. Subsequent movement of the knob of the change speed lever to cause pivoting of the bracket 3 about the pins 4 produces engagement of first or second ratio in the associated ratio-change gearbox.

By lifting the collar 10 of the change speed lever 1 the reverse stop is disengaged. The lever can then be moved into the reverse-ratio 'gate' of the shift pattern shown in FIG. 7, namely into the position designated R in FIG. 2, to allow engagement of reverse ratio in the associated ratio-change gearbox.

From the first pivotal position shown in FIG. 2 the change speed lever 1 is pivotable about the pivot pin 2 into a second pivotal position which is shown in FIG. 3. Movement of the change speed lever to this second pivotal position is transmitted by way of the stirrup-joint connection to the crank pin 9 to produce pivotal movement of both the selector shaft 12 and the associated interlock plate 11 into a second position corresponding to the third and fourth ratio Low range 'gate' of the shift pattern shown in FIG. 7. Subsequent movement of the knob of the change speed lever to cause pivoting of the bracket 3 about the pins 4 produces engagement of third or fourth ratio in the associated ratio-change gearbox T-1.

As can be seen from FIGS. 2 and 3, in both the first and second positions of the selector shaft 12 and the associated interlock plate 11 (as well as in the reverse position), the bracket 3 forming the movable carrier member for the change speed lever 1 is held by the compression spring 5 in a right-hand position in which the bracket flange abuts the abutment face 6 of the fixed locating pin 7. In this translational position of the bracket 3 the jaws 17 of the latch member 14 hold both the range selector shaft 15 forming the range selector member, and the operating lever 16, in a first position maintaining the associated auxiliary two-speed transmission unit in a low-range position. However, whereas in the first position of the interlock plate 11 the latch member 14 abuts the outer periphery of the interlock plate, and thereby prevents movement of the latch member and range selector shaft 15, in the second position of the interlock plate the latch member is in a position to selectively move downwards into cooperating locking relationship with the interlock plate, as can be seen from FIG. 3.

From the second pivotal position shown in FIG. 3 the change speed lever 1 is pivotable into a third pivotal position which is shown in FIG. 4. However, this pivotal movement of the change speed lever does not produce any further pivotal movement of the selector shaft 12, since such further pivotal movement is prevented by a stop (not shown) within the associated ratio-change gearbox : instead, the crank pin 9 acts as a fulcrum for the change speed lever, such that the movement of the lever is transmitted by way of the pivot pin 2 to exert a camming action on the bracket 3 to move the bracket to the left, with compression of the spring 5, until the bracket flange abuts the left-hand abutment surface 18 of the fixed locating pin 7. This leftward movement of the bracket 3 is transmitted by way of the bracket flange and jaws 17 to produce anticlockwise pivotal movement of the latch member 14, the range selector shaft 15 and the operating lever 16. The operating lever 16 is thereby moved from its first, low-range position to a second, high-range position; also, the hooklike latch member 14 is moved into a position in which it cooperates with the interlock plate 11 to lock the interlock plate, and hence the selector shaft 12, in its second position.

This third pivotal position of the change speed lever 1, shown in FIG. 4, corresponds to the third and fourth ratio High range 'gate' which is shown shaded in the shift pattern in FIG. 7. The associated auxiliary two-speed transmission unit is then in its High-range condition, and the change speed lever may be moved to pivot the bracket 3 about the pins 4 to engage either third or fourth ratio in the associated ratio-change gearbox.

On return movement of the change speed lever 1 to its second position, namely the position corresponding to the third or fourth ratio Low range 'gate' of the shift pattern in FIG. 7, the crank pin 9 again acts as a fulcrum because the interlock plate 11 and the associated selector shaft 12 are locked by the hooklike latch member 14. The compression spring 5 assists return movement of the bracket 3 to the Low-range position shown in FIG. 3, in which the interlock plate 11 is again free as a result of clockwise movement of the hooklike latch member 14.

As has already been mentioned, pivotal movement of the change speed lever 1 about the pivot pin 2, corresponding to movement between the various 'gates' of the shift pattern shown in FIG. 7, is possible only in the neutral position of the change speed lever since, as can be seen from FIG. 1, it is only in this position that the recess 19 in the bracket flange is aligned with the central land of the fixed locating pin 7, such that translational movement of the bracket 3 is possible to move the bracket flange between the annular grooves 20 and 21 on the two sides of the central land of the locating pin.

Thus not only is it possible to use a single change speed lever for operating both a ratio selector member for a normal transmission and a range selector member for an auxiliary transmission, but in addition, in the described embodiment of the selector mechanism, range changes between the Low and High ranges are possible only whilst the normal transmission is in a neutral condition, and thus disconnected from the vehicle engine. In contrast to the position if separate levers were used for ratio change and range change, it is therefore not essential for the vehicle driver to remember to declutch in order to effect a synchronous range change. Since, however, it can be assumed that a driver will normally declutch at all times that he wishes to effect a change by way of the change speed lever, irrespective of whether it is a ratio change or a range change, there is in normal practice a double safeguard against involuntary connection of the drive line during a change between the Low and High ranges.

I claim:

1. A selector mechanism for change speed gears comprising, a change speed lever, a carrier member, first pivot means mounting said lever on said carrier for pivotal movement about a first axis, second pivot means mounting said carrier member for pivotal movement about a second axis and for mounting said carrier member for translational movement along the second axis; a ratio selector member formed by a selector shaft which is mounted for pivotal movement about its major axis, and for translational movement along said major axis, means connecting said change speed lever to said ratio selector member for effecting selective pivotal and translational movement of the ratio selector member in response to predetermined movement of said change speed lever, a range selector member, said carrier member having a motion-transmitting connection to said range selector member formed by a pivotal lever whose pivot axis extends parallel to said first axis in an arrangement in which said carrier member is selectively movable, in response to movement of said change speed lever to thereby effect movement of said range selector member.

2. A selector mechanism according to claim 1, a spring operatively connected to said carrier exerting a force opposing the translational movement of the carrier member in one direction.

3. A selector mechanism according to claim 1, said selector member having a crank pin, said means connecting said change speed lever and said ratio selector member comprises a stirrup-joint connection in the form of a pair of legs which depend from the change speed lever and straddle a crank pin of said selector member.

4. A selector mechanism according to claim 1, said selector member having a crank pin, said means connecting said change speed lever and said ratio selector member comprises a stirrup-joint connection in the form of a pair of unequal-length legs which depend from the change speed lever and straddle said crank pin of said selector member, the longer leg being normally engageable with the ratio selector member to inhibit movement of the change speed lever into a reverse-ratio position, but being movable into a position clear of the ratio selector member by movement of a part of the change speed lever.

5. A selector mechanism according to claim 1, in which the motion-transmitting connection between the carrier member and the range selector member comprises a flange formed on one of these members and jaws formed on the other of these members.

6. A selector mechanism according to claim 5, a fixed detent member, said flange being formed on said carrier member and including a recess which is selectively cooperable with said fixed detent member such that the translational movement of the carrier member is possible in only one pivotal position of said carrier member.

7. A selector mechanism for change speed gears of separate first and second transmissions comprising a change speed lever, a carrier member, pivot means mounting said lever for limited turning movement on said carrier member, a gear ratio selector member for the first transmission operatively connected to said change speed lever movable to predetermined positions in response to the turning movement of said lever member to predetermined positions with respect to said pivot means, support means for said carrier member, and connector means for slidably and pivotally mounting said carrier member to said support means so that said carrier may be turned relative to said support means to cause a corresponding movement of said gear ratio selector member, gear ratio selector means for the second transmission, and connector means operatively connected to said carrier member and to said range selector means operative in response to predetermined movement of said lever and the resulting sliding movement of said carrier member to move said gear ratio selector member to a predetermined position.

8. In combination a selector mechanism, first and second operatively connected gear units, each of said gear units having a plurality of gear ratios, a first operator member operatively connected to said first gear unit for changing the gear ratios thereof, a second operator member operatively connected to said second gear unit for changing the gear ratios thereof, said selector mechanism comprising a selector lever operatively connected to said first and second operator members, carrier means for mounting said selector lever for limited pivotal movement about a first axis for selecting neutral or predetermined gear ratios of said first gear unit with said second unit being conditioned for a predetermined gear ratio, support means for said carrier means mounting said carrier means for limited longitudinal movement along said axis to a predetermined station when said first gear unit is in neutral and in response to the turning of said lever on said pivot axis to condition said second gear unit for a predetermined gear ratio.

9. In combination a selector mechanism, a first transmission unit for providing forward drive speed ratios and a reverse drive speed ratio, a second transmission unit operatively connected to said first transmission unit for providing forward drive speed ratios, a first operator member operatively connected to said first transmission unit for changing the speed ratios in accordance with the position with said operator member, a second operator member operatively connected to said second transmission unit for changing the speed ratios of said second unit in accordance with the position of said second operator member, a selector lever operatively connected to said operator members, a support, carrier means for said lever, pivot means for pivotally mounting said carrier means to said support to permit said lever to be turned to actuate said first operator member and thereby change the speed ratio of said first transmission unit and slidably mounting said carrier for longitudinal movement on said support to predetermined longitudinal positions along said support, connector means for connecting said carrier to said second operator member for moving said second operator member to a position whereby the speed ratio of the second unit is changed in response to predetermined movement of said carrier to a predetermined longitudinal position whereby said lever may subsequently be turned on said pivot to condition said first unit for a predetermined speed ratio.

10. In combination a selector mechanism, first and second operatively connected gear units, each of said gear units providing at least two different input/output speed ratios, first operator means operatively connected to said first gear unit and movable between first and second positions to change the input/output speed ratios of said first unit, second operator means operatively connected to said second gear unit and movable between first and second positions to change the input/output speed ratio of said second unit, a shiftable selector means for selectively moving said first and second operator means, carrier means mounting said selector means for limited movement with respect to a first axis to effect the movement of said first operator means and the selection of predetermined input/output speed ratios of said first unit, and means mounting said carrier member for limited sliding movement along said first axis when said first gear unit is in a neutral condition to move said second operator means from said first to said second position to change the input/output speed ratio of said second unit so that said first unit can be subsequently shifted from neutral to a predetermined input/output speed ratio.

* * * * *